(12) United States Patent  
Morin et al.

(10) Patent No.: US 8,585,314 B2  
(45) Date of Patent: Nov. 19, 2013

(54) QUICK-FASTENING SAFETY DEVICE FOR ATTACHING A TOOL TO THE END OF THE ARM OF A HYDRAULIC POWER SHOVEL OR THE LIKE

(75) Inventors: Christian André Morin, La Chapelle Saint-Mesmin (FR); Marcel André Jean Morin, Saint Jean le Blanc (FR)

(73) Assignee: KLAC Industrie, Societe Anonyme, Orleans Cedex (FR)

( * ) Notice: Subject to any disclaimer, the term of this patent is extended or adjusted under 35 U.S.C. 154(b) by 0 days.

(21) Appl. No.: 13/322,781

(22) PCT Filed: May 19, 2010

(86) PCT No.: PCT/FR2010/000379  
§ 371 (c)(1),  
(2), (4) Date: Jan. 26, 2012

(87) PCT Pub. No.: WO2010/136664  
PCT Pub. Date: Dec. 2, 2010

(65) Prior Publication Data  
US 2012/0114413 A1    May 10, 2012

(30) Foreign Application Priority Data  
May 29, 2009 (FR) ...................................... 09 02593

(51) Int. Cl.  
*B25G 3/18* (2006.01)
(52) U.S. Cl.  
USPC ........................... 403/322.3; 414/723; 37/468

(58) Field of Classification Search  
USPC ............... 403/316, 319, 322.3, 325; 414/723; 37/468  
See application file for complete search history.

(56) References Cited

U.S. PATENT DOCUMENTS

| 4,480,955 | A | * | 11/1984 | Andrews et al. | ............... 414/723 |
| 5,224,816 | A | * | 7/1993 | Kaczmarczyk et al. | ...... 414/723 |
| 6,139,212 | A | * | 10/2000 | Heiple | ........................ 403/322.1 |
| 6,254,331 | B1 | * | 7/2001 | Pisco et al. | ..................... 414/723 |

(Continued)

FOREIGN PATENT DOCUMENTS

| DE | 20 2006 018263 | 2/2007 |
| FR | 2 703 113 | 9/1994 |
| FR | 2 765 601 | 1/1999 |
| FR | 2 809 779 | 12/2001 |

OTHER PUBLICATIONS

Form PCT/IB/373 and English Translation of Form PCT/IS A/237.

*Primary Examiner* — Joshua Kennedy  
(74) *Attorney, Agent, or Firm* — Renner, Kenner, Greive, Bobak, Taylor & Weber

(57) ABSTRACT

A safety device for quick-fastening a tool to the end of an arm including two portions (1 and 2), one of which is attached to the arm of the machine and the other of which is attached to the tool. The first portion (1) includes a cradle (3) that is insertable under the arm of the other portion (2) having an extension (5) in the form of a hook, having at least one side lug (10) that can pass through notched openings (8, 9) in the first portion (1) and in a locking plate (6). The locking plate (6) is capable of sliding on the middle portion of the first portion (1) so as to be inserted under the hook extension (5) by springs (7). The locking plate (6) is provided with an abutment member (12) that limits the return movement of the plate (6) in order to prevent the notched openings (8, 9) from coinciding.

3 Claims, 3 Drawing Sheets

(56) References Cited

U.S. PATENT DOCUMENTS

| | | | |
|---|---|---|---|
| 6,422,805 B1 * | 7/2002 | Miller | 414/723 |
| 6,487,800 B1 * | 12/2002 | Evans et al. | 37/468 |
| 6,629,811 B1 * | 10/2003 | Husson | 414/723 |
| 6,688,801 B2 * | 2/2004 | Husson | 403/322.1 |
| 7,086,821 B1 * | 8/2006 | Reicks | 414/723 |
| 7,654,019 B2 * | 2/2010 | Yeager et al. | 37/468 |
| 2003/0113159 A1 | 6/2003 | Husson | |
| 2006/0191169 A1 * | 8/2006 | Martin | 37/468 |

* cited by examiner

QUICK-FASTENING SAFETY DEVICE FOR ATTACHING A TOOL TO THE END OF THE ARM OF A HYDRAULIC POWER SHOVEL OR THE LIKE

TECHNICAL FIELD

The present invention relates to a quick-fastening safety device for attaching a tool to the end of the arm of a hydraulic power shovel or the like, hereinafter called the machine.

BACKGROUND ART

A quick fastening device is a mechanical assembly comprising two portions, one of which is attached to the tool, a bucket for example, and the other one of which is borne by the arm of the machine.

The state of the art in this field is comprised, in particular, of the quick fastening device described in the French Patent published under No. 2809779.

The fastening device described in this patent comprises two substantially stirrup-shaped portions, the first portion, affixed to the arm of the machine, having a cradle that can be inserted under a shaft borne by the second portion, affixed to the tool.

The median portion of the second portion has a hook-shaped extension that can pass through an opening of the first portion and an opening of a locking plate sliding on the median portion of said first portion under the action of return springs.

Means are provided for maintaining the locking plate in the "set position", that is to say, a position in which the hook-shaped extension can pass freely through the median portion of the first portion and the locking plate.

While passing through the two openings, the hook-shaped extension releases the locking plate which, under the action of the springs, is inserted under the extension.

As the surfaces (hook and plate) adapted to cooperate are more or less embedded in the ground, the plate is not completed inserted under the hook, thereby giving the illusion of a locking which, in fact, is incomplete.

As a result, shocks and vibrations can cause the tool that is incompletely connected to the arm of the machine to separate and drop during operation.

To overcome this disadvantage, it has been provided to equip the hook with at least one lateral lug that can pass through a notch provided on the opening of the first portion and on the opening of the locking plate. Therefore, passing through the two openings is possible only when the locking plate is in the set position.

As soon as the locking plate starts to be inserted under the hook, under the action of the springs, the aforementioned lug extends above the locking plate, opposing the pivoting of the second portion.

This safety device is particularly efficient, but it is dependent upon the action of the springs that oppose the backward movement of the locking plate.

If the springs break or are detached, there is nothing left to oppose the backward movement of the locking plate; such backward movement being facilitated when the locking plate is in a substantially vertical position, as it then slides downward, under its own weight, to occupy a position in which the notches and openings mentioned hereinabove coincide with one another: separation of the tool is possible.

DISCLOSURE OF THE INVENTION

The safety device of the invention, which overcomes the aforementioned drawback, is advantageous in that the locking plate is provided with an abutment member that limits the movement of said plate under the effect of its weight, in order to prevent the notch of the plate and that of the portion of the fastening device supporting said plate from coinciding.

BRIEF DESCRIPTION OF THE DRAWINGS

The present invention will be better understood from the following description, with reference to the annexed drawings provided only by way of example, and in which.

PREFERRED EMBODIMENT FOR CARRYING OUT THE INVENTION

Figure 1:
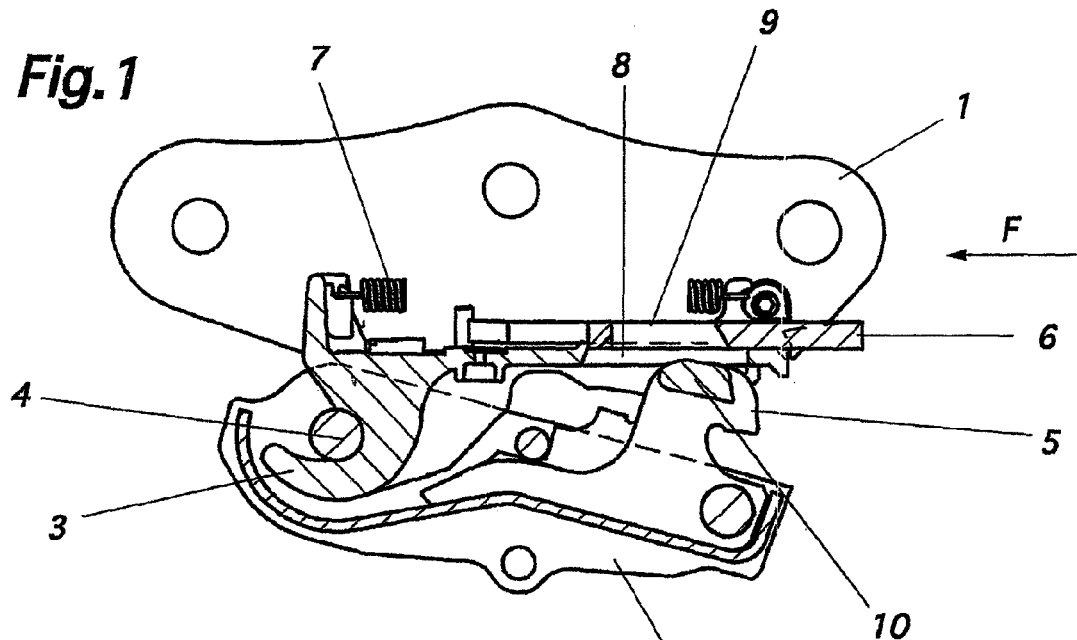
FIG. 1 is a cross-sectional view taken along the line I-I of FIG. 2, showing a fastening device according to the invention, the locking plate being shown in the set position; neither the tool nor the arm of the machine are shown.
Figure 2:
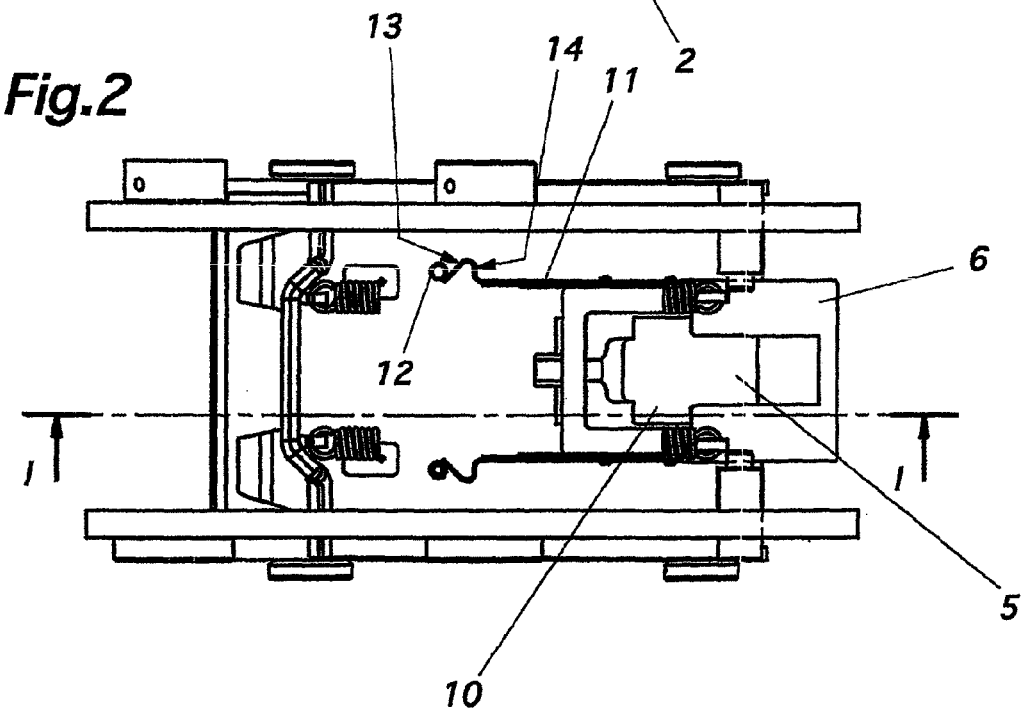
FIG. 2 is the top view of FIG. 1.

In a known manner, the quick fastening device is comprised of two portions 1 and 2, the first portion 1 being fixed to the arm of the machine (not shown), whereas the second portion is fixed 110 the tool (a bucket, not shown, for example).

Each portion substantially has the shape of a stirrup, the portion 1 having a cradle 3 that is capable of being engaged under a shaft 4 of the second portion via an appropriate maneuver of the arm of the machine.

The median portion of the portion 2 has a hook 5 under which a locking plate 6, sliding on the median portion of the portion 1 under the action the springs 7, can engage.

The aforementioned median portion and the locking plate each have an opening 8 and 9, respectively, and the openings are notched at one end to allow passage of the lateral lugs 10 carried by the hook 5.

Figure 3:
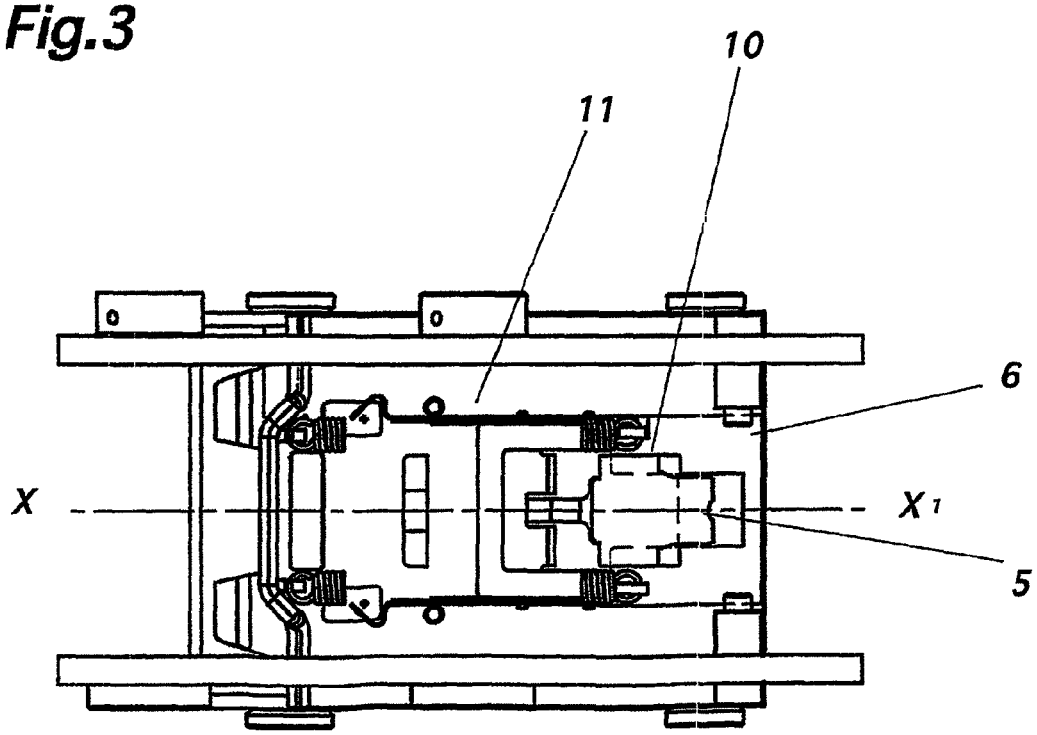
FIG. 3 is a view similar to FIG. 2, the two portions of the fastening device being locked on one another.
Figure 4:
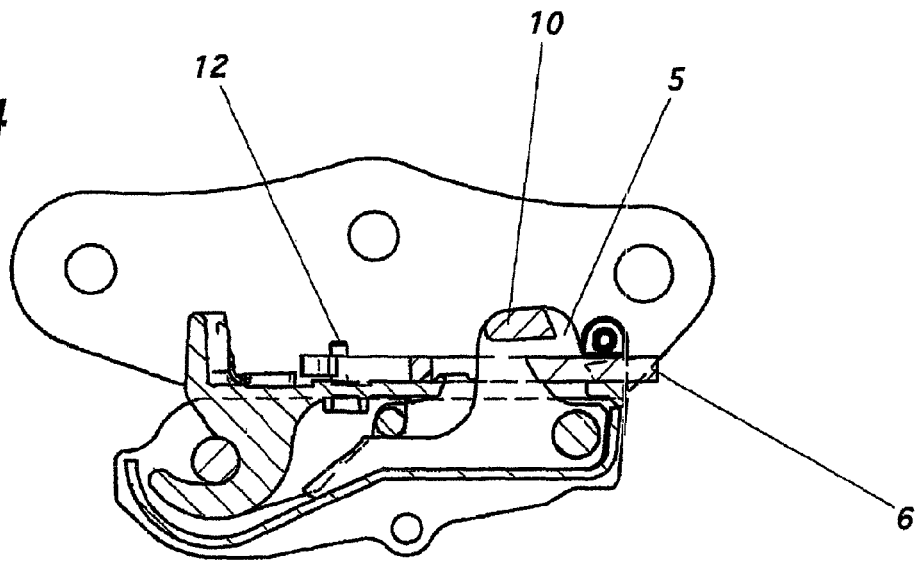
FIG. 4 is a view similar to FIG. 1, showing the implementation of the device of the invention, in the case in which the usual springs for returning the locking plate are absent.

When the hook 5 passes through the two openings, from the position shown in FIG. 1, the locking plate is completely inserted under the hook under the action of the springs 7; this is the position shown in FIG. 3.

If, due to the presence of soil, for example, the locking plate is not completely inserted under the hook, despite the action of the springs 7, the two portions cannot be detached because the lugs 10 extend above the locking plate. It is this safety device that was the object of the French Patent No. 2809779.

This safety device may prove inadequate if the springs 7 break.

In this case, indeed, there is nothing left to oppose the movement of the locking plate so that the latter slides under the action of its weight into the position shown in FIG. 1, a position in which the hook 5 can pass freely through the median portion of the portion 1 and the locking plate, despite the presence of the lugs 10.

The device of the invention, which overcomes this disadvantage, is advantageous in that the locking plate is associated with a member that limit the backward movement of said plate under the effect of its weight.

According to one embodiment, this member is comprised, in its simplest form, of a flexible blade 11 extending substantially in the direction of movement of the sliding locking plate, and whose free end can take support against an abutment 12 of the median portion of the portion 1.

The free end of the blade 11 has an oblique portion 13, or ramp, connecting to the blade via a portion 14 extending substantially perpendicular to the plane of said blade.

The abutment 12 is preferably comprised of a cylindrical lug arranged substantially tangentially to the plane of the blade 11 and ahead of the ramp 13 when the locking plate is in the set position (FIG. 1).

As shown in the drawings, two blades 11 arranged symmetrically with respect to the XX1-axis are used.

When the hook 5 passes through the openings 8 and 9, the plate 6 moves along the arrow F under the action of the springs 7, the blades 11 flex and the "heads" 13-14 occupy the position shown in FIG. 3.

If the springs break, nothing is left theoretically to oppose the backward movement of the plate 6.

Figure 5:
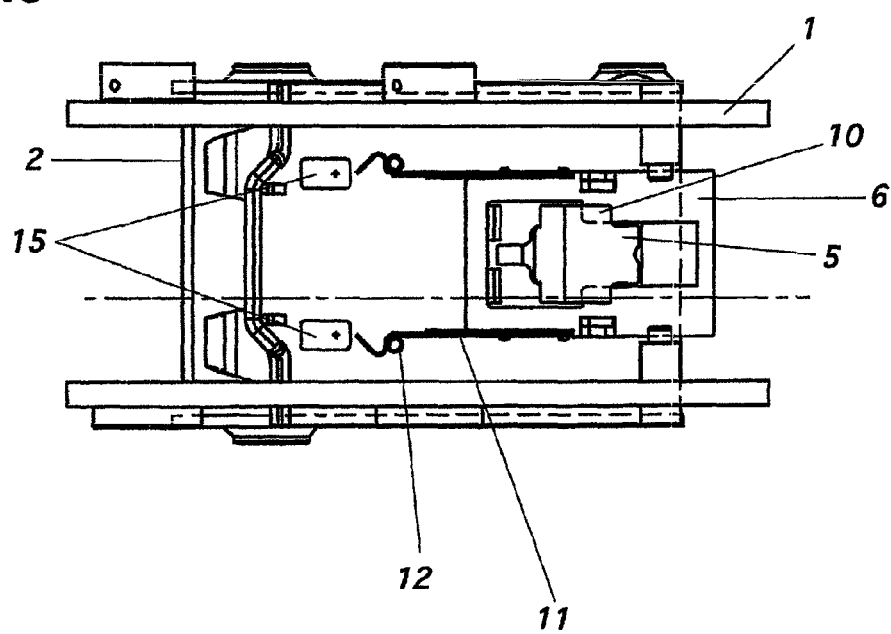
FIG. 5 is the top view in FIG. 4.

In fact, this backward movement is limited by the device of the invention: the portions 14 blades take support against the lugs 12, as shown in FIG. 5. This figure clearly shows that the lugs 10 of the hook extend above the locking plate; separation is therefore not possible despite the absence of the springs 7.

Naturally, the force required to flex the blades 11 is much less than that generated by the spring 7, or that which can be applied to the plate in order to set it.

The safety device is completed with sensors 15 arranged on the median portion of the portion 1 above which the heads 13-14 extend when the two portions are properly locked on one another.

In this way, it is possible to send a signal to the operating cab of the machine to indicate the quality of the locking, since the latter is dependent upon the position of the aforementioned heads.

The invention claimed is:

1. A quick fastening device comprising a safety device and being of the type comprising first and second portions, where said first portion is fixed to an arm of a machine and said second portion is fixed to a tool, said first portion comprising a cradle that is insertable under a shaft of said second portion, a median portion of said second portion having an extension in the shape of a hook, said hook-shaped extension having at least one lateral lug that can pass through a notched opening of said first portion and a notched opening of a locking plate, said locking plate being capable of sliding on a median portion of said first portion in order to be inserted under the hook by the action of springs biasing the plate in a forward direction, characterized in that said first portion includes an abutment member and at least one flexible blade which is fixed on said locking plate and extends in the direction of movement of said locking plate, where a free portion of said blade is shaped to take support against said abutment member interposed in the path of said blade, such that said abutment member limits the movement of said locking plate in a backward direction if the springs break, detach or otherwise fail in order to prevent said notched openings from coinciding such that the hook-shaped extension can pass freely therethrough.

2. The quick fastening device of claim 1, characterized in that said free portion of said flexible blade has an oblique portion connected to said blade by a portion extending substantially perpendicular to the plane of said blade.

3. The quick fastening device of claim 2, characterized in that, when said first portion and said second portion are properly locked, said free portion of said flexible blade extends above a sensor that is capable of sending a signal showing the quality of the locking to an operating cab of the machine.

* * * * *